Oct. 13, 1931.  E. WILDHABER  1,826,852
HYPOID GEAR
Original Filed May 10, 1926  5 Sheets-Sheet 1

INVENTOR
Ernest Wildhaber
BY
B. V. Schlesinger
ATTORNEY

Oct. 13, 1931.  E. WILDHABER  1,826,852

HYPOID GEAR

Original Filed May 10, 1926   5 Sheets-Sheet 2

INVENTOR
*Ernest Wildhaber*
BY
ATTORNEY

Oct. 13, 1931.  E. WILDHABER  1,826,852
HYPOID GEAR
Original Filed May 10, 1926  5 Sheets-Sheet 4

INVENTOR
*Ernest Wildhaber*
BY
ATTORNEY

Oct. 13, 1931.　　　E. WILDHABER　　　1,826,852

HYPOID GEAR

Original Filed May 10, 1926　　5 Sheets-Sheet 5

INVENTOR
*Ernest Wildhaber*
BY
ATTORNEY

Patented Oct. 13, 1931

1,826,852

UNITED STATES PATENT OFFICE

ERNEST WILDHABER, OF BROOKLYN, NEW YORK, ASSIGNOR TO GLEASON WORKS, OF ROCHESTER, NEW YORK, A CORPORATION OF NEW YORK

HYPOID GEAR

Original application filed May 10, 1926, Serial No. 108,036, and in Great Britain April 12, 1927. Divided and this application filed May 5, 1927, Serial No. 189,129.

The present invention relates to gears which mesh with axes non-intersecting and non-parallel and particularly to hypoid gears. In a more specific aspect, this invention pertains to hypoid gear pairs, where each member of the pair is provided with longitudinally curved teeth.

The primary object of this invention is to provide a gear pair of the character described which will be smooth and quiet in operation.

A further object of this invention is to provide gear pairs of such character that each member thereof may be produced in a simple operation on existing machinery without the use of unnecessarily complicated apparatus or motions.

It has been proposed, heretofore, to produce gear pairs of the character referred to, in such manner that one member of the pair was non-generated, that is formed in a process in which no rolling motion was employed, the other member of the pair being produced in a generating operation in which the blank and tool were rolled relatively to each other in the manner of a gear meshing with the non-generated member.

Gear cutting experience indicates, generally, however, that gears produced in a generating or rolling process have a smoother tooth surface finish than have gears which are non-generated.

The purpose of this invention, hence, is to provide hypoid gears of such type that the members of the pair will mesh together correctly and that each member may be generated. This invention provides a new form of hypoid gear pair, such that each member of the pair may be generated and generated in a comparatively simple operation.

The gear or larger member of the pair of gears constructed according to this invention, is of the same general structure as a generated bevel gear. Such a gear can be produced according to the known methods of generating bevel gears and upon existing machinery. The pinion or smaller member of the pair is a generated gear conjugate to a basic gear, other than its mate, whose axis is offset from the axis of the pinion. The operation of producing the pinion requires no more motions than for producing the gears, and may be performed on a machine of the character described in my copending application, Serial No. 77,310, filed December 23, 1925. It will be understood, of course, that the operations might be reversed and the pinion produced as a bevel gear and the gear or larger member of the pair from an offset basic gear.

Besides the advantage obtained from the offset of the axes which permits of drives not possible with bevel gears, a further purpose of this invention is to provide a hypoid pair which will have increased strength and longer life. To this end, the pinion or smaller member of a pair of gears produced according to this invention will, preferably, have a greater spiral or tooth inclination angle than the gear or larger member of the pair, as it has been found that with such a construction the pinion can be made larger and hence stronger than a bevel pinion of a corresponding ratio.

The principal objects of this invention have already been described. Other objects will be apparent hereinafter from the specification and from the recital of the appended claims.

This application is a division of my copending application, Serial No. 108,036, filed May 10, 1926.

Figure 1:
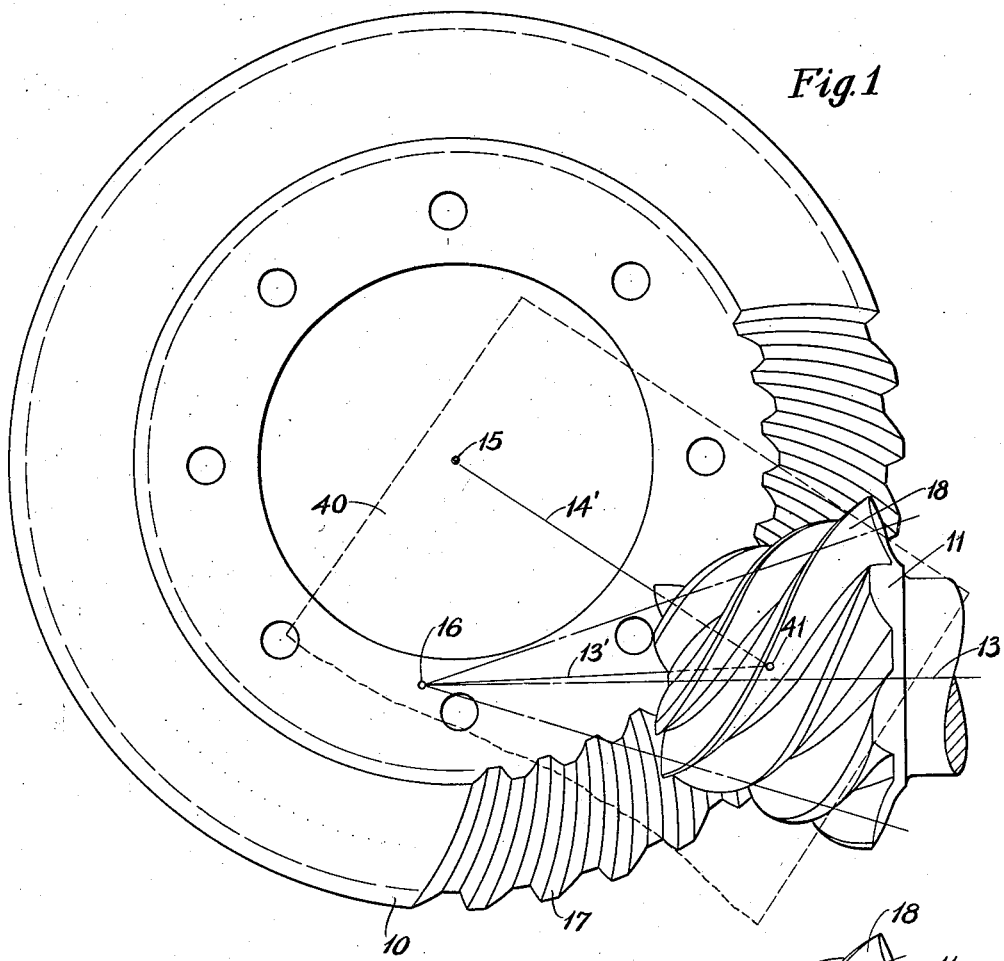
Figures 1 and 2 are a plan view and a side elevation, respectively, of a pair of hypoid gears constituting one embodiment of this invention.
Figure 2:
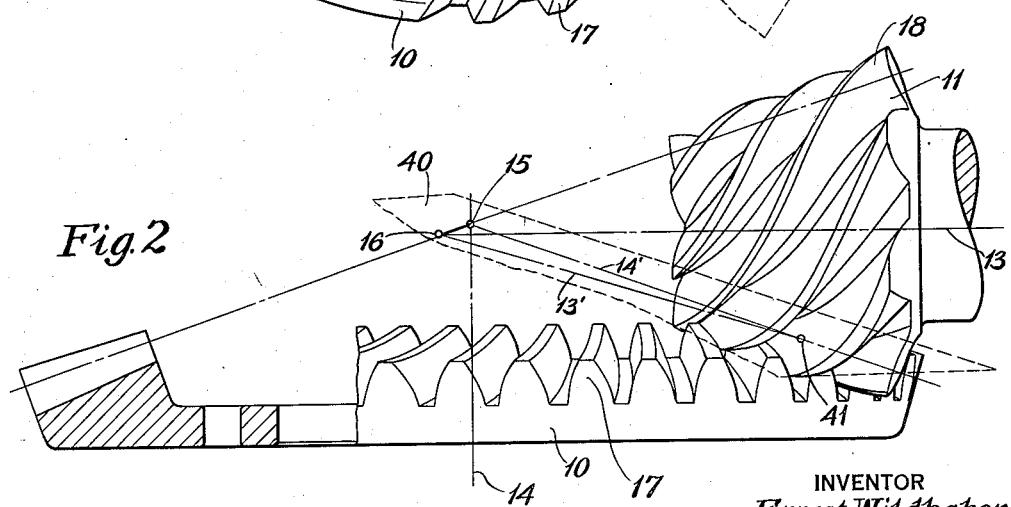

A pair of hypoid gears constructed according to one embodiment of this invention is shown in Figures 1 and 2. 10 is the gear or larger member of the pair and 11 the pinion or smaller member of the pair. These gears mesh with offset non-parallel axes, that is, the axis 13 of the pinion is angularly disposed to and offset from the axis 14 of the gear. The gears are of the general form of tapered gears, having apexes at 15 and 16 for gear and pinion, respectively.

Each of these gears is provided with longitudinally curved teeth, the gear teeth being indicated at 17 and the pinion teeth at 18. The side tooth surfaces of both gear and pinion are generated. In the preferred embodiment each gear is conjugate to a basic gear whose teeth are curved longitudinally along circular arcs and whose tooth surfaces are surfaces of revolution.

The gear or larger member of the pair 10 is of the same general construction as a generated spiral or longitudinally curved tooth bevel gear. The pinion or smaller member of the pair 11 is a gear conjugate to a basic gear having teeth longitudinally curved, preferably, as stated, along circular arcs, whose axis is angularly disposed to and offset from the axis of the pinion. The spiral or tooth inclination angle of the teeth of the pinion 11 is larger than the spiral or tooth inclination angle of the gear 10. With this construction the pinion 11 can be made larger and hence stronger than a bevel pinion of a corresponding ratio. In practice, the spiral angle of the teeth of the gear is made smaller than the spiral or tooth inclination angle of a corresponding bevel gear, while the spiral or tooth inclination angle of the pinion is made the same or larger than the spiral or tooth inclination angle of a corresponding bevel pinion. Preferably, the pinion will be so constructed that its apex 16 in mesh will lie beyond the axis 14 of the gear, that is, beyond a line perpendicular to the axes of the two members, as the object of increased strength is furthered by such construction.

The primary purpose of this invention is, as stated, to provide a form of hypoid gears such that both members of the pair may be generated so that they will be smooth and quiet in operation. A further purpose is to keep the generating operations as simple as possible, avoiding any unnecessary complications in the machinery required for the production of the gears. By generating the pair in the manner already indicated, namely, by generating the gear as a bevel gear, that is, in a generating operation in which the tool represents a basic gear whose axis intersects the axis of the blank and the tool and blank are rolled relatively to each other about the axis of such basic gear, and by generating the pinion from a basic gear whose axis is offset from the axis of the blank an amount determined by the dimensions of the pair and their relative positions in mesh both objects can be accomplished.

Figure 3:
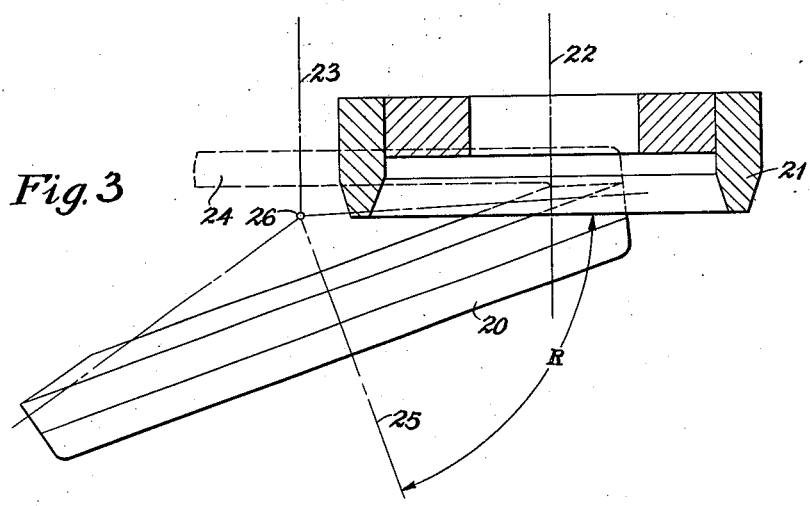
Figure 3 is a diagrammatic view, illustrating the preferred method of producing the gear or larger member of the pair.
Figure 4:
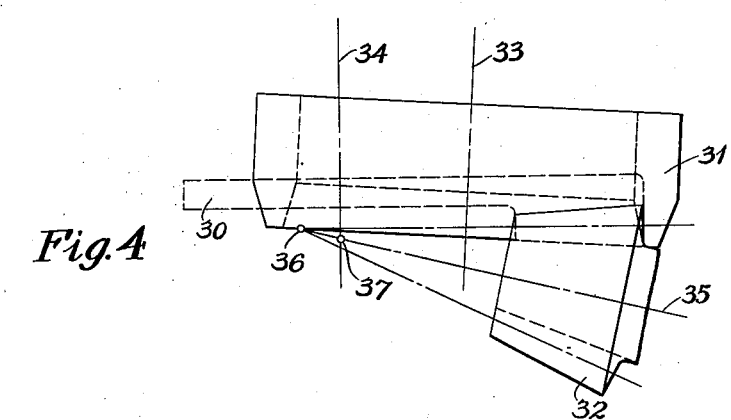
Figures 4 and 5 are a side elevation and a plan view, respectively, illustrating diagrammatically the preferred method of producing the pinion or smaller member of the pair.
Figure 5:
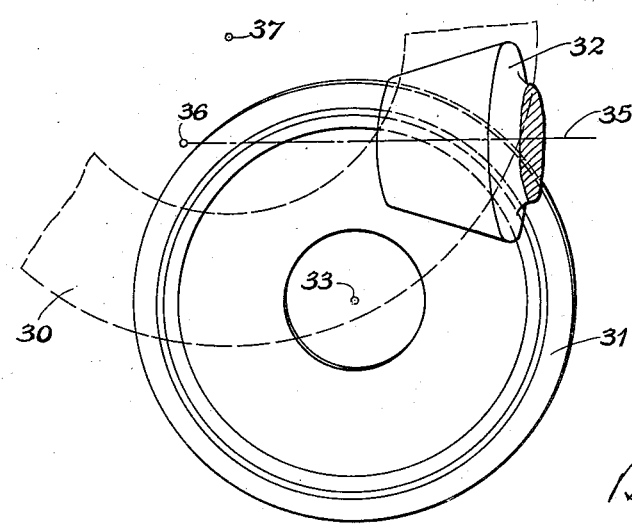

Figures 3 to 5 inclusive have been incorporated in the drawings to show one and the preferred method of manufacturing the pair illustrated in Figures 1 and 2.

Figure 3 shows the method of generating the gear. The gear blank is indicated at 20. Its tooth surfaces are cut with a rotary annular face mill 21 which represents a tooth surface or adjacent tooth surfaces of the basic gear 24 with which the blank rolls theoretically during the generating process. In the preferred process, the basic gear 24 is a nominal crown gear, that is, a gear having a plane top surface and a conical pitch surface and the axis 22 of the tool is set parallel to the axis 23 of this imaginary basic gear 24. This enables the gear to be generated upon a machine of a type in common use viz., a Gleason spiral bevel gear generator. In such a machine, the tool is mounted so that its axis is parallel to the axis of the cradle, the latter axis representing the axis of the basic generating gear. The tool and blank are positioned in engagement, the blank being set to its root angle R. The blank is then rotated on its axis 25, while the tool is rotated on its axis 22 and while simultaneously tool and blank are moved relatively to each other about an axis 23, intersecting the axis 25 of the blank in its apex 26, and representing the axis of the basic generating gear 24. The tooth surfaces generated on a gear in the process described, are conjugate to the tooth surfaces of the basic generating gear, which are surfaces of revolution.

Preferably, the face mill 21 is provided with cutting blades having finish cutting edges for simultaneously finish-cutting adjacent tooth sides of a blank. The adjacent tooth surfaces generated upon a gear by such a tool will be arranged in pairs generated from a common center.

After one tooth surface or a pair of adjacent tooth surfaces have been generated in the manner described, the tool and blank are withdrawn relatively to each other and the blank indexed. The tool and blank are then returned into engagement and another tooth face or pair of adjacent tooth faces is cut in the manner described before. This alternate cutting and indexing proceeds until all of the tooth surfaces of the blank have been finished. It will be understood, of course, that instead of intermittently indexing the blank, the operation might be a hobbing or continuous indexing operation and the tool either a face mill hob or a hob of the worm type.

The preferred method of producing the pinion is illustrated in Figures 4 and 5. The tooth surfaces of the pinion are generated conjugate to a basic gear 30 whose axis is offset from the axis of the pinion blank during the generating operation. As here illustrated, the basic gear 30 is a true crown gear, that is, a gear having a plane pitch surface. A rotary face mill is again, preferably, employed as the cutting tool and this face mill 31 is so positioned relative to the blank 32 as to represent the imaginary basic generating gear 30, the axis 33 of the tool being inclined to the axis 34 of the basic generating gear. The blank 32 is positioned in cutting engagement with the tool, with its axis 35 offset from and angularly disposed to the axis 34 of the basic generating gear. Preferably, the apex 36 of the blank extends beyond the apex or center 37 of the basic generating gear.

The tool 31 is then rotated on its axis in engagement with the blank, while the blank is rotated on its axis 35 and while simultaneously the tool and blank are moved relatively to each other about an axis 34 representing the axis of the basic gear 30. After a tooth face or adjacent tooth faces of the blank have been cut, the tool and blank will be withdrawn relatively to each other and the blank indexed. The tool and blank will then be returned into engagement and another tooth face or pair of tooth faces cut. The alternate cutting and indexing will proceed until the blank is complete. The generating operation described can be performed upon a machine such as described in my copending application, Serial No. 77,310, filed December 23, 1925, where the axis of the cradle represents the axis of the basic gear 30 to which the pinion is to be generated conjugate and where the axis of the pinion blank may be offset from the axis of the cradle any desired amount. It is obvious, that the pinion, like the gear may be generated in a hobbing operation either by a face mill or a worm hob.

By the methods described, both gear and pinion are provided with generated tooth surfaces conjugate to the tooth surfaces of the respective basic gears 24 and 30, whose tooth surfaces are surfaces of revolution. The profiles of the cutting tools may be either straight or curved. In producing the pinion, the cutting tool will preferably be so set with reference to the blank that the spiral angle of the teeth produced on the pinion will be larger than the spiral angle of the teeth produced on the gear.

Instead of face mills, planing tools may be employed and these may be either reciprocatd in curved paths or in a straight path and the curvature of the teeth on the blank produced by a continuous indexing motion of the blank, as will be understood by those skilled in the art. The present invention is applicable, also, to the production of hypoid gears from basic gears whose teeth are straight, the gear or larger member of the pair being preferably produced as a straight tooth bevel gear and the pinion conjugate to a straight tooth basic gear whose axis is offset from the axis of the blank. The teeth of the basic gears may be either radial or skew. The basic gears themselves may be either nominal crown gears or true crown gears.

Hypoid gears mesh with a combined rolling and sliding action. This combined rolling and sliding action, when the gears are properly designed, makes for long life and tends to preserve throughout the life of the gears the desired tooth forms. It has been determined that a pair of hypoid gears will have the requisite strength and the desired mesh when they are so proportioned as to contact along the entire length or substantially along the entire length of the tooth surface of one member of the pair. It has been found that the desired tooth surface contact can be realized when the line of action between the gears extends substantially in the direction of the pinion axis, namely, when the gears are so proportioned that in development in a plane tangent to their pitch surfaces at a mean contact point they mesh substantially along the projected pinion axis. Gears constructed according to the present invention, therefore, should be so proportioned that their line of action extends substantially in the direction of the pinion axis projected into the common tangent plane.

Figure 6:
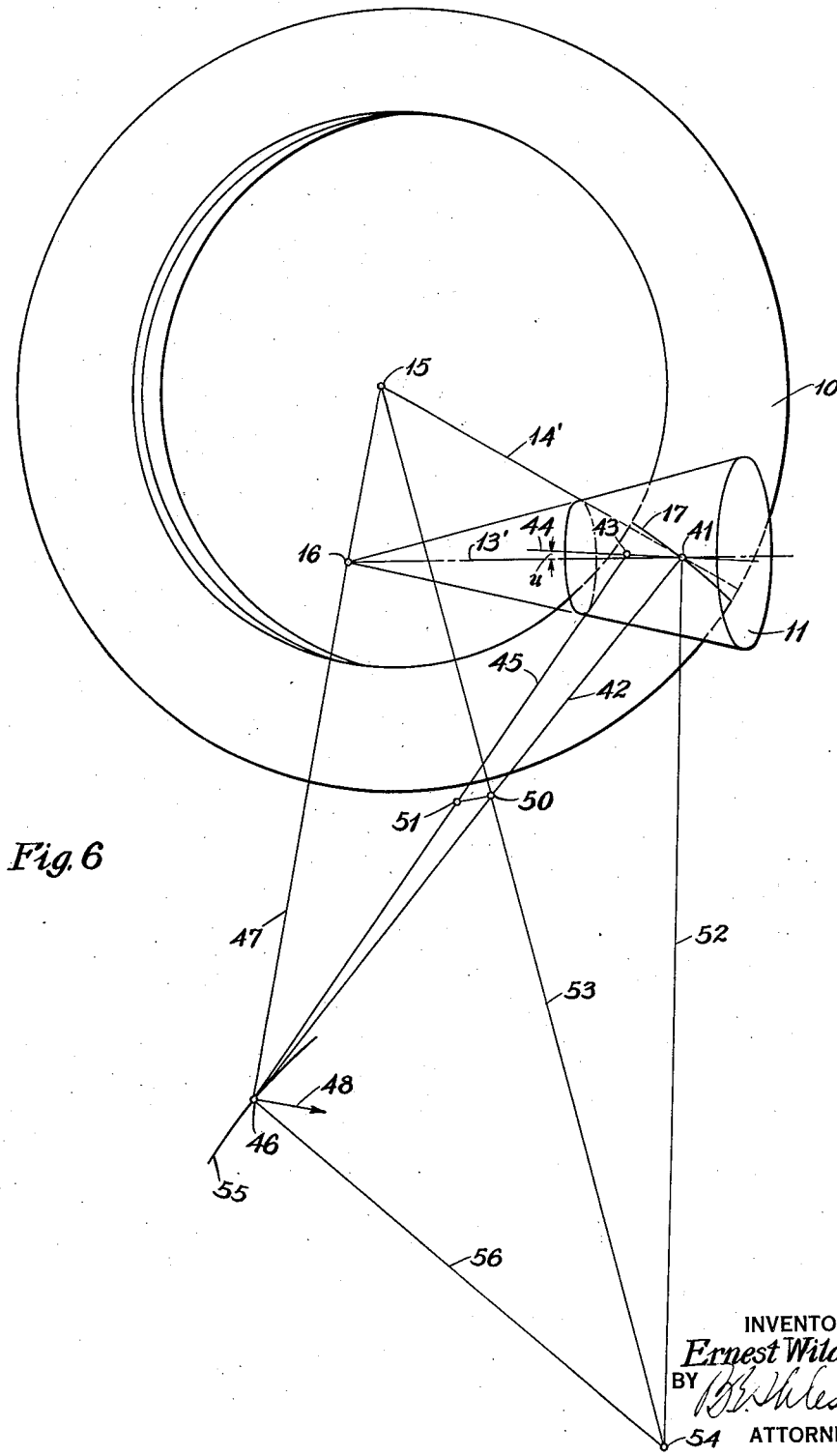
Figure 6 is a diagrammatic view, taken at right angles to the pitch plane of a hypoid pair, illustrating certain principles as to the preferred method of constructing these gears.

The manner in which a gear pair constructed according to the present invention can be so proportioned will be briefly described next. The pitch surfaces of the gear 10 and pinion 11 are substantially conical. 40 indicates a plane which is tangent to the pitch surfaces of the two gears 10 and 11 at a point of contact 41 which is located about in the center of the faces of the gears. The plane 40 will hereinafter be referred to as the pitch plane. In Figure 6, the plane of the drawing is the pitch plane. In Figures 1, 2, and 6, the axes of gear and pinion projected into the tangent plane 40 are indicated at 14' and 13', respectively. The projected axes 14' and 13' intersect in the contact point 41.

In the description which follows, the line of action will be determined for a pair of gears which mesh along the same line of action, which is the case, when the spiral angle or inclination angle of the teeth is the same on both sides of the teeth.

When one member of the pair is cut by cutting two side faces simultaneously, the necessary corrections can be made in the same way as when cutting spiral bevel gears.

In order that a gear and pinion should transmit uniform motion, the moments acting on the two gears must be maintained in a constant proportion all along the line of action between the two gears. The forces acting on a pair of gears act in a direction perpendicular to the teeth of said gears, that is, in the direction of the tooth normals. Now the forces acting on the teeth in the direction of the normals can be resolved into two components, one, perpendicular to the pitch plane at any point of contact between the gears and the other lying in the pitch plane and extending in the direction of the normal projected into said plane. If the moments produced by these individual components are maintained in the case selected, individually in the proportion of the total moments acting on the two gears, that is, in the proportion of the respective tooth numbers of the pair, uniform motion can be secured.

It is obvious that at the point 41, which is the point of intersection of the projected axes 14' and 13' of gear and pinion in the pitch plane, the vertical component of tooth pressure will not exert any turning moment on the gears 10 and 11. It is also obvious that at any other point of contact between the two gears which lies outside the point 41 and on the projected pinion axis 13', there will be no turning moment exerted on the the pinion while there will be a turning moment exerted on the gear. Consequently, the turning moments exerted on gear and pinion will be in a different ratio from their tooth numbers. Consequently, in order that a pair of gears, constructed according to this invention, transmit uniform motion, their line of action should lie outside the projected pinion axis. It must be some line along which the moments exerted on the gear and pinion at all points of contact between the two, will be in the proportion of the tooth numbers of the pair. The first problem is, therefore, to determine a correct line of action for a pair of gears constructed according to this invention.

Referring to Figure 6, 42 indicates the projection of a normal to the tooth surface 17 of the gear at the point of contact 41 between this tooth surface and a tooth surface of the pinion. Let 43 represent a point of contact other than the point 41 on the line of action 44 whose position is to be determined. 45 is the projection of a normal to the tooth curve at the point 43. The forces acting on gear and pinion, as previously stated, can be resolved into a component perpendicular to the pitch plane 40 and into a component extending along the projection 45 of the tooth normal into that plane.

The moments transmitted to the gear and pinion by a force extending along any line 45 in the pitch plane will be at a constant ratio when the line 45 passes through the intersection point 46 of the normal 42 with the line 47 connecting the gear apex 15 with the pinion apex 16. That this is so is evident when the force along the line 45 is decomposed into a component extending along the connecting line 47 and into a component perpendicular to said line and extending in the direction 48 and passing through the point 46. The first component, namely, that extending along the line 47 produces no turning moment, inasmuch as it intersects the axes of the two gears. The second component, namely, that extending in the direction 48 naturally produces moments of constant ratio in all imaginable cases. Hence it is evident that a constant ratio between the two gears can be secured if the gears are so proportioned as to mesh along some line of action such that the normals at different contact points, when projected into the pitch plane intersect in a common point 46, as above described.

The line of action 44 must fulfill a further requirement, namely, that the components of the tooth pressures which are perpendicular to the pitch plane 40 shall produce on the gear and pinion moments in the ratio of the tooth numbers. Let:

$G, g$ = the pitch angles of gear and pinion, respectively, that is, the inclination angles of their axes to the pitch plane 40.

$S$ = the distance of any considered point 43 upon the line of action from the mean contact point 41.

$Q, q$ = the distances of the point 46 from the gear and pinion apexes respectively, that is, the distances 15—46 and 16—46.

$u$ = the angle between the line of action 44 and the projected pinion axis 13'.

$e$ = the angle between the projected axes 14' and 13'.

$a$ = the normal pressure angle.

$P$ = the component of tooth pressure in the pitch plane.

$P \tan a$ = the component of tooth pressure perpendicular to the pitch plane.

$N, n$ = the tooth numbers of gear and pinion respectively.

$hp, hg$ = the spiral angles of gear and pinion, respectively, $(hg - hg = e)$.

As previously stated, the component of tooth pressure perpendicular to the pitch plane at the point 41 exerts no turning moment on either gear or pinion because the point 41 is the point of intersection of the projected gear and pinion axes 14' and 13'. The component of tooth pressure perpendicular to the pitch plane at any other point 43 of the line of action 44 produces the following moments or torques on gear and pinion, respectively:

$$P \tan a \cdot S \cdot \sin(e-u) \cos G$$

and $$P \tan a \cdot S \cdot \sin u \cdot \cos g$$

To transmit uniform motion, these moments must also be proportional to the tooth numbers $N, n$. Whence:

$$P \tan a \cdot S \cdot \sin(e-u) \cos G : P \tan a \cdot S \cdot \sin u \cdot \cos g = N : n$$

and $$\frac{\sin(e-u)}{\sin u} \cdot \frac{\cos G}{\cos g} = \frac{N}{n}$$

By transformation:

$$\frac{\sin(e-u)}{\sin u} = \frac{\sin e \cdot \cos u - \cos e \cdot \sin u}{\sin u} = \sin e \cdot \cotan u - \cos e$$

Whence:

$$\sin e \cdot \cotan u - \cos e = \frac{N}{n} \cdot \frac{\cos g}{\cos G}$$

and:

$$\cotan u = \cotan e + \frac{N}{n} \cdot \frac{\cos g}{\cos G} \cdot \frac{1}{\sin e} \quad (1)$$

This equation gives the angle $u$, which is the angle between the required line of action 44 and the projected pinion axis 13′, and hence gives the direction of the required line of action 44 between the gear and pinion.

Adverting, again to the horizontal components of the tooth moments, that is, to the pitch plane components of the tooth load which extend along the line 45, it will be found that these are in the ratio:

$$\frac{P \cdot Q \sin G}{P \cdot q \sin g}$$

As previously stated, the pitch plane components of tooth pressure must also be in the ratio of the tooth numbers of the two gears in order to transmit uniform motion. Hence:

$$\frac{\sin G}{\sin g} = \frac{N}{n} \cdot \frac{q}{Q} \quad (2)$$

If, as usual, the axes 13 and 14 of the two gears are disposed at right angles, the following relation between the pitch angles $G, g$ and the angle $e$ should exist, as may be determined with the known means of descriptive geometry:

$$\tan G \cdot \tan g = \cos e \quad (3)$$

As has been previously described, the gear is generated preferably in the same manner as a spiral bevel gear, namely by a rolling movement about the apex 15. In this method of generation, the circular curve produced by the cutter is transmitted to the pitch surface of the gear.

Having determined the location of the line of action 44 and of the point 46 of intersection of the normals, it is possible by the known methods of descriptive geometry to determine the location of the center of tooth curvature with reference to the line of action, that is, the required cutter radius, so as to secure a tooth curvature which will give the required tooth contact. For, in curved tooth gears, the tooth curvature must be such that the projected normals, such as 42 and 45, to the tooth curves along the line of action, intersect in the point 46. Instead of determining the location of the center of tooth curvature from location of the point 46, it is obvious that we can assume instead the cutter radius and determine the point 46.

The steps employed in determining the location of the center of tooth curvature or the location of the point 46, when one or other of these factors is known, will be clear if we start from an assumed cutter radius or center of tooth curvature and show the relationship between this cutter radius or center of tooth curvature and the point 46.

Let us assume a cutter radius $r$ such that the center of tooth curvature of the tooth 17 lies at the point 50 on the normal 42. When the point of contact between the gears has moved to the point 43 of the line of action, the center of tooth curvature will have moved about the axis 15 of the gear, from 50 to 51, the distance 43—51 being plotted equal to $r$. The line 45 connecting the points 43 and 51 accordingly, will be the tooth normal at the point 43. In this regard it is to be noted that the radius $r$ is substantially the same whether the actual gear 10 is considered or the corresponding basic gear whose axis is perpendicular to the pitch plane 40 and passes through the apex 15. With our premise that the forces acting along the line 45 must produce moments of a constant ratio, it will be seen that this normal 45 must intersect the normal 42 in the point 46. Hence, from an assumed cutter radius, that is, from a center of tooth curvature, the point 46 may be determined and conversely from the point 46 the center of tooth curvature may be determined.

Inasmuch as very small distances S are considered, the movement of the normal from the position 42 to the position 45 may be regarded as an elementary motion, that is, as a turning motion about an instantaneous axis or center. The end point 41 of the normal moves on the line 44. Hence the instantaneous axis of said motion must be on a line 52 drawn perpendicular to the line of action 44 at the point 41. Furthermore, the point 50 of said normal moves about the gear apex 15 at right angles to the line 53 connecting the center of curvature 50 with the gear apex 15. The instantaneous axis must, therefore, also lie on the line 53. The instantaneous axis lies, hence, at the intersection point 54 of the lines 52 and 53. The two positions 42 and 45 of the considered normal, are, therefore, at a constant distance from the instantaneous axis 54 and hence are tangent to a circle 55 drawn about the axis 54 as a center.

Adjacent tangents intersect between their points of tangency. Since the distance S is very small the tangents 42 and 45 will intersect in a point which practically coincides with the point 46 of tangency of the line 42. The point 46 can, therefore, be located by drawing a perpendicular 56 to the line 42 from the instantaneous center 54.

From the relation just described, either the point 46 may be determined, from a known cutter radius $r$ or the cutter radius $r$ may be determined from a known or assumed point 46.

Summing up one way of procedure in dimensioning a pair of gears constructed according to this invention is as follows:

(1) Angle $e$, the angle between the projected gear and pinion axes and the spiral angle $hp$ of the pinion are assumed ($hg = hp - e$).

(2) The pitch angles G and $g$ of gear and pinion, the angle $u$, the angle between the required line of action and the projected pinion axis, and the location of the gear and pinion apexes 15 and 16, are then determined from Equations (1), (2) and (3).

(3) The lengthwise curvature of the gear teeth or, in other words, the radius of the cutter is now determined in the manner already described. That is, by drawing the line 56 through point 46 perpendicular to line 42, by drawing line 52 through the contact point 41 perpendicular to the line of action 44, and by connecting the intersection point 54 between the lines 52 and 56 with the gear apex 15 by the line 53. The point where this line 53 intersects the normal 42 is the center 50 of tooth curvature and the distance 41–50 equals the sought cutter radius $r$.

Longitudinally curved tooth hypoid gears constructed according to this invention are preferably cut with rotary face mills, in the manner described with reference to Figures 3, 4 and 5. These tools are usually made with fixed diameters, that is, in fixed sizes, though some means of adjustment is ordinarily provided for varying the center distances of the individual cutter blades and in this way some adjustment of the cutter radius is possible. Usually, the cutter radius $r$ obtained from the procedure described above is somewhat different from the predetermined cutter radius, that is, from the radius of an existing tool. In this case, the radius of the cutter may be changed slightly by adjusting this blade inwardly or outwardly of the cutter axis, as by shimming. However, it is generally preferable to maintain the predetermined cutter radius and change some one of the other gear dimensions. Thus one of the pitch angles, $g$ or G may be changed by a small amount. The other dimensions conforming to this changed dimension will again be derived as already described. It is likely that a cutter radius slightly different from an existing cutter radius will again be obtained. The final data of the pair of gears can now be determined, however, by interpolating the two results obtained, so as to have the tooth curvature conform to a predetermined cutter radius.

As previously described, the gear or larger member of the pair has, preferably, the same general construction as a bevel gear and is produced in the same way as a generated bevel gear. The pinion may be generated from a basic gear which is identical with or complementary to the basic gear from which the gear is generated. Spiral bevel gears which mesh with intersecting axes when generated conjugate to complementary crown or basic gears will transmit uniform motion and will mesh with one another with line contact. Hypoid gears, however, which are conjugate to complementary basic or crown gears are not fully conjugate to each other. That is to say, that while they transmit true uniform motion they will not contact along lines with each other but only in points, mathematically speaking. For this reason, different crown gears or different basic gears are preferably used when generating the members of a pair of hypoid gears constructed according to this invention. The crown gear to which the tooth surfaces of the pinion are generated conjugate is, preferably, so selected that the pinion produced will mesh properly with its mate gear along the pitch lines of the two gears. In other words, the crown gear is so selected that the areas of the pinion teeth which extend along the pitch lines are truly conjugate to the corresponding areas of the teeth of the mate gear.

Figure 7:
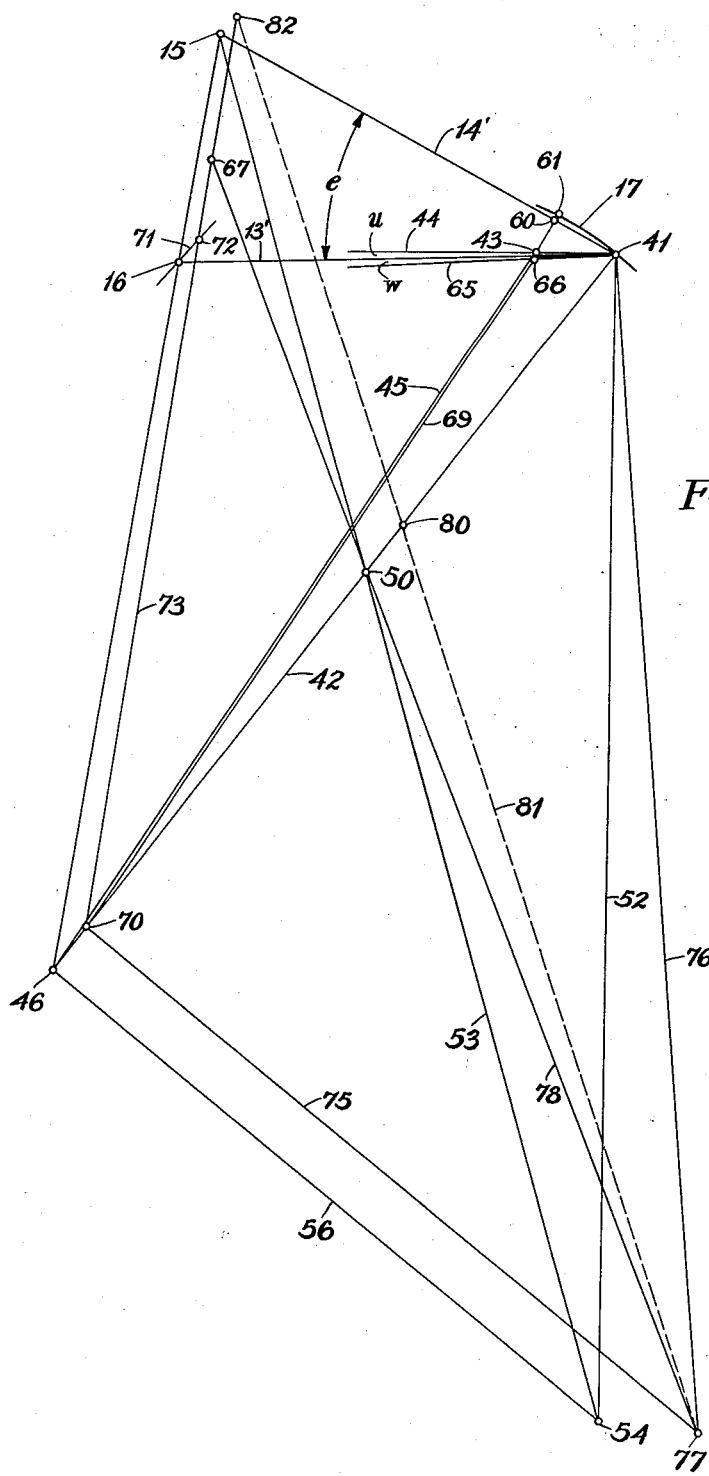
Figures 7, 8 and 9 are diagrammatic views further illustrating the principles underlying the production of gear pairs according to the preferred embodiment of this invention.
Figure 8:
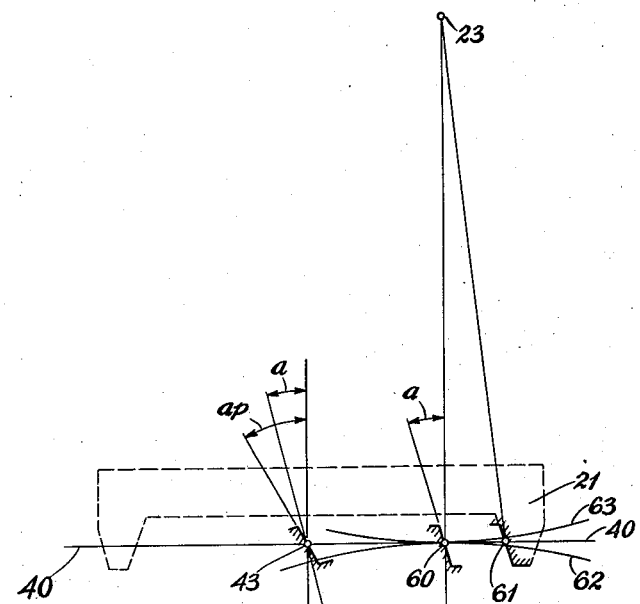
Figure 9:
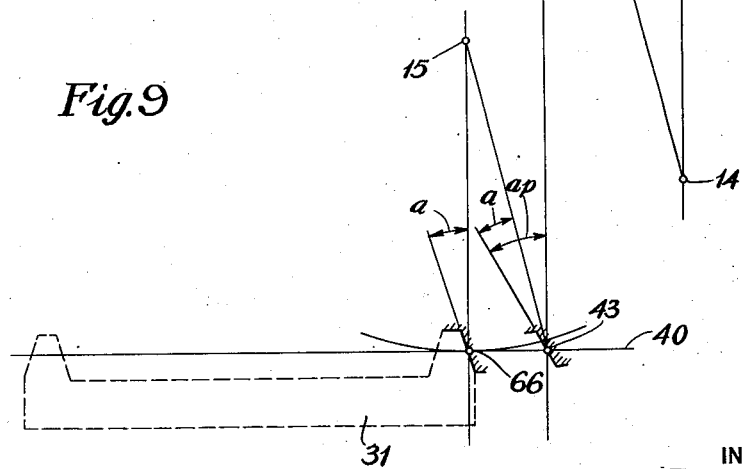

The method by which the pinion teeth are cut so as to secure this conjugacy of the pitch line areas, will now be described. Referring now to Figures 7, 8, and 9. During the generation of the gear or larger member of the pair, the cutter 21 which represents the generating basic gear, transmits its pressure angle $a$ to the gear along the pitch surface of the gear. At the points 41 and 60, the pitch cone surface of the basic gear employed in generating the gear or larger member of the pair is tangent to the pitch plane 40, the plane of the paper in Figure 7 and the true pressure angle of the gear equals the pressure angle $a$ of the cutter 21 referred to the pitch plane 40. This is true because the gear is produced like a spiral bevel gear, namely, by a rolling motion in which the blank rolls about its apex on a basic gear such as a nominal crown gear, and the line of action between the gear blank and the basic gear extends along the projection 14' of the gear axis into the pitch plane 40.

The generating gear reproduces its pressure angle $a$ on the gear or larger member of the pair at corresponding points on the pitch surfaces 63 and 62 of the two gears. Therefore, the pressure angle of the hypoid gear referred to its own pitch surface 62 is the same at 60 and 43 as at 61. At point 43, however, the pitch surface 62 of the hypoid gear is not tangent to the pitch plane 40, see Figure 8, and the pressure angle $ap$ at the point 43 referred to the pitch plane 40 is accordingly different from the pressure angle $a$ at this point when referred to the pitch surface 62 of the gear. At the point 60 the two pitch surfaces 62 and 63 are mutually tangent and the pressure angle is the same referred to either surface. By turning the point 61 about the axis 14 of the gear until it reaches the point 43 the pressure angle at the point 43, as referred to the pitch plane, can be determined by the known methods of descriptive geometry. It should be noted that Figures 8 and 9 are exaggerated showings. In reality, the distance between the point 43 and the point 60 and the point 43 and the point 66 is very small and the distance of point 43 from the pitch surface 62 can be neglected as compared with the distance 60—43.

From what has just been said, it will be apparent that the pressure angle of the gear referred to the pitch plane 40 is different at the point 43 from its pressure angle referred to the same plane at the point 41. This difference must be taken into account in producing the pinion in order that gear and pinion when in mesh should transmit uniform motion. It is to be noted that in generating the pinion, the imaginary generated gear is a true crown gear with a plane pitch surface. If the line of action between this generating crown gear and the pinion being cut were along the line 44, the pinion would have the same pressure angle at point 43 as at point 41 and accordingly would not match the gear which, as has just been explained, has a different pressure angle at point 43 from that at point 41. The pinion must be generated, therefore, along some other line of action such as the line 65, making an angle $w$ with the projected pinion axis 13', such that when the pinion has been generated with a pressure angle at the point 66 of this line of action equal to the pressure angle $a$ of the cutter 31, the relative rotation of the pinion from the point 66 to point 43 will result in changing the pressure angle of the pinion, as referred to the pitch plane 40, to the same pressure angle $ap$ as that of the gear at the point 43, whereby the gear and pinion may match each other along the line of action 44.

This point 66 can be determined with the known methods of descriptive geometry by turning the point 43 about the axis 15 of the pinion until it reaches a point 66 where the pressure angle referred to the pitch plane equals that of the cutter 31. In this way, the line of action 65 between the pinion and its generating gear may be determined so that the pinion will mesh properly with its mate gear along a line of action 44.

The above discussion is based particularly upon the use of a spherical face mill cutter, that is, a face mill having cutting blades of circular profile, but the basic principles involved are equally applicable to straight sided, that is, conical cutting tools. In either case, a different line of action must be found for the generating crown gear and pinion from that between the two gears in order that the teeth of the two gears match along the line of action 44.

Having thus determined the line of action 65, the next step is to determine the location of the center of the crown gear to which the tooth surfaces of the pinion are generated conjugate, in such way that the mesh between the crown gear and the given pinion actually takes place along the line 65. In determining the location of the crown gear axis 67, use is, again, made of the fact that forces acting along the known tooth normals must produce turning moments on pinion and crown gear which are at a constant ratio.

From the line of action the position of the normals 42 and 69 at the points of contact 41 and 66 on the line of action 55 can be determined. These normals intersect in some point, as the point 70, which is usually different from the point 46. The location of the point 70 can be determined from the known location of the tooth normals along the line of action 44 by the known methods of descriptive geometry by turning the tooth normals about the axis of the pinion until the point 43 has moved to the point 66 and determining the intersection point 70 of the normal in the new position 69 with the normal in its position 42.

The center or apex of the generating crown gear for the pinion must lie on some straight line in the pitch plane 40 to effect mesh along the line of action 65. The position of this straight line can be determined as follows: Line 71 is drawn through the apex 16 of the pinion parallel to the normal 42. A distance $B'$ is laid off on this line 71 so that:

$$B' = B \frac{\sin w}{\cos (hp+w)} \cdot \frac{\tan a}{\tan g}$$

In this formula $w$ is the angle between the line of action 65 and the projected pinion axis 13' and B is the distance 41—70. The other symbols have been introduced previously. The distance B' has been plotted in Figure 7 equal to the distance 16—72. The center of the crown gear should lie on the line 73 connecting the points 70 and 72. Another line on which the center of the crown gear should lie is determined by the principles previously explained in connection with the determination of the relationship between the intersection point 46 and the center of tooth curvature 50. Line 75 is drawn through the point 70 at right angles to the projected tooth normal 42 and line 76 is drawn through the contact point 41 at right angles to the line of action 65. The intersection point 77 of these lines 75 and 76 is thus the instantaneous axis of the normal for the line of action 65. By drawing a line 78 through the center of tooth curvature 50 and intersecting this line with the line 73 previously determined, the center 67 of the crown gear can be located.

The direction of the plotting distance B' indicated in Figure 7 corresponds to the concave side of the pinion teeth. This distance should be plotted in the opposite direction for the convex sides of the teeth. Usually, the location of the point 43 is different for the two tooth sides and usually, therefore, the crown gear center 67 is different for the two tooth sides. In order, therefore, to have the two sides of the teeth of gear and pinion mesh along the same line of action 44, as in the preferred embodiment of the invention, it is necessary to use different crown gears for generating the opposite sides of the pinion teeth.

It is usually found that when the pinion is produced conjugate to a crown gear determined by the methods just described, this pinion will have transverse tooth profiles which are curved more than necessary for transmitting uniform motion to the gear. The transverse tooth profiles of such a pinion will not make contact to their full depths with the tooth profiles of the mating gear. While this feature makes the pair of hypoid gears less sensitive to misalignment it is frequently not desirable because it reduces the load carrying capacity. Differently curved profiles may be obtained on the pinion teeth by generating the pinion conjugate to a crown gear having a different offset but whose center lies on the line 73 previously determined. In this case, a face mill of slightly different diameter from the face mill used on the gear will be employed. For instance, a tool having a radius 41—80 may be used in cutting the concave sides of the pinion teeth. In this event, the center of the crown gear which was previously determined as lying at 67 will now lie at the intersection of the line 73 with the line 81 drawn from the instantaneous axis 77 and passing through the center 80 of the pinion tooth curvature, that is, it will be at the point 82.

The ratio between crown gear and pinion is so determined that the component of tooth pressure which is perpendicular to the tooth surfaces at the point 41 is equal on crown gear and pinion. This ratio is found to be equal to the ratio of the distances 70—82 and 70—72, divided by the sine of the pitch angle $g$ of the pinion, the sine of the pitch angle of the crown gear equalling, of course, 1. Thus the ratio is:

$$\frac{70-82}{70-72} \cdot \frac{1}{\sin g}$$

The offset of the new crown gear axis 82 from the projected pinion axis 13' is larger than the offset of the crown gear axis 67 from the pinion axis 13' in Figure 7. Broadly, the larger the offset between the axes of the pinion and the generating crown gear, the flatter the tooth profiles are on the concave sides of the pinion teeth, and the smaller the offset the more curved these profiles are. On the convex sides of the pinion teeth, the profiles are the more curved, the larger the offset, and the flatter, the smaller the offset. This relationship makes it possible to produce tooth profiles on the pinion of any desired curvature and is important inasmuch as a pair of hypoid gears, in use, must not only be able to run properly together in their theoretically correct position but must, also, be capable of some adjustments or deviation from this theoretically correct position. Any necessary or suitable deviation from the theoretical tooth profiles can, accordingly, be readily obtained by generating the pinion conjugate to a generating crown gear which is suitably offset from the pinion blank axis.

Changes in the longitudinal tooth curvature or any desired matching or mismatching of the teeth of a pair longitudinally may be obtained in the usual way by slightly changing the diameter of the pinion cutters. Changes in the pressure angle of the pinion may be effected by changing the cutter inclination. Changes in the lengthwise inclination or spiral angle of the teeth may be obtained by the usual methods employed in cutting spiral or longitudinally curved tooth bevel gears. The spiral angle of the pinion is made larger than the spiral angle of the gear, as it has been found that with this construction the pinion can be made larger and hence stronger than a bevel pinion of a corresponding ratio.

While the present invention has been described particularly with reference to longitudinally curved tooth gears, it is applicable, also, to hypoid gears in which one member of the pair has straight teeth, either radial or skew, and is produced in a manner similar to a straight tooth bevel gear and in which the pinion is generated conjugate to a straight tooth basic gear whose axis is offset from the axis of the pinion blank.

In general, it may be said, that while I have illustrated one embodiment of my invention, the invention is capable of further modification within its limits and the scope of the appended claims and that this application is intended to cover any variations, uses, or adaptations of my invention, following, in general, the principles of the invention and including such departures from the present disclosure as come within known or customary practise in gear cutting and may be applied to the essential features hereinbefore set forth and as fall within the limits of the appended claims.

Having thus described my invention, what I claim is:

1. A pair of tapered gears meshing with axes non-intersecting and non-parallel, each of which is provided with longitudinally curved teeth having generated side tooth surfaces.

2. A pair of tapered gears meshing with axes non-intersecting and non-parallel, each of which is provided with longitudinally curved teeth having generated side tooth surfaces which are conjugate to surfaces of revolution.

3. A pair of tapered gears meshing with axes non-intersecting and non-parallel, each of which has generated side tooth surfaces, the teeth of the smaller member of the pair being more inclined to a generatrix of its pitch surface than the teeth of the larger member of the pair.

4. A pair of tapered gears meshing with axes non-intersecting and non-parallel, each of which is provided with longitudinally curved teeth having generated side tooth surfaces, the spiral angle of the teeth of the smaller member of the pair being larger than the spiral angle of the teeth of the larger member of the pair.

5. A pair of tapered gears meshing with axes non-intersecting and non-parallel, each of which is provided with longitudinally curved teeth having generated side tooth surfaces which are conjugate to surfaces of revolution, the spiral angle of the teeth of the smaller member of the pair being larger than the spiral angle of the teeth of the larger member of the pair.

6. A pair of tapered gears meshing with axes non-intersecting and non-parallel, each of which is provided with longitudinally curved teeth having generated side tooth surfaces which are conjugate to surfaces of revolution, the adjacent side tooth surfaces of one member of the pair being arranged in pairs curved longitudinally about the same center.

7. A pair of tapered gears meshing with axes non-intersecting and non-parallel, each of which is provided with longitudinally curved teeth having generated side tooth surfaces which are conjugate to surfaces of revolution, adjacent side tooth surfaces of one member of the pair being arranged in pairs curved longitudinally about the same center, the spiral angle of the teeth of the smaller member of the pair being larger than the spiral angle of the teeth of the larger member of the pair.

8. A pair of tapered gears meshing with axes non-intersecting and non-parallel, and each of which has generated side tooth surfaces, the larger of which is a bevel gear, the smaller member of the pair having teeth more inclined to a generatrix of its pitch surface than those of the larger member of the pair.

9. A pair of tapered gears meshing with axes non-intersecting and non-parallel and each of which is provided with longitudinally curved teeth having generated side tooth surfaces, the larger member of the pair being a bevel gear and the smaller member of the pair having teeth whose spiral angle is larger than the spiral angle of the teeth of the larger gear.

10. A pair of tapered gears meshing with axes non-intersecting and non-parallel and each of which has generated side tooth surfaces, the larger of which is a bevel gear having generated side tooth surfaces conjugate to surfaces of revolution.

11. A pair of tapered gears meshing with axes non-intersecting and non-parallel, comprising a generated bevel gear and a gear having tooth surfaces generated conjugate to the tooth surfaces of a crown gear whose axis is offset from the axis of this second gear.

12. A pair of tapered gears meshing with axes non-intersecting and non-parallel, comprising a generated bevel gear and a gear having tooth surfaces generated conjugate to the tooth surfaces of a basic gear other than its mate, whose axis is offset from the axis of said gear.

13. A pair of tapered gears meshing with axes non-intersecting and non-parallel, comprising a generated bevel gear having longitudinally curved teeth and a gear having tooth surfaces which are generated conjugate to the tooth surfaces of a longitudinally curved tooth basic gear whose axis is offset from the axis of the second gear.

14. A pair of tapered gears meshing with axes non-intersecting and non-parallel, comprising a generated bevel gear having longitudinally curved teeth and a gear having tooth surfaces which are generated conjugate to the tooth surfaces of a crown gear having teeth curved longitudinally on circular arcs, whose axis is offset from the axis of the second gear.

15. A pair of tapered gears meshing with axes non-intersecting and non-parallel and each of which has generated side tooth surfaces conjugate to surfaces of revolution, the larger of which is a bevel gear 16. A pair of tapered gears meshing with axes non-intersecting and non-parallel, each of which has longitudinally curved teeth having generated side tooth surfaces, the larger of which is a bevel gear.

17. A hypoid gear having tooth surfaces generated conjugate to the tooth surfaces of a basic gear other than its mate, whose axis is offset from the axis of said gear.

18. A hypoid gear having tooth surfaces generated conjugate to the tooth surfaces of a crown gear whose axis is offset from the axis of said gear.

19. A hypoid gear having tooth surfaces which are generated conjugate to the tooth surfaces of a longitudinally curved tooth basic gear whose axis is offset from the axis of said gear.

20. A hypoid gear having tooth surfaces which are generated conjugate to the tooth surfaces of a longitudinally curved tooth crown gear whose axis is offset from the axis of said gear.

21. A hypoid gear having tooth surfaces which are generated conjugate to the tooth surfaces of a crown gear, having teeth curved longitudinally on circular arcs, whose axis is offset from the axis of said gear.

22. A pair of gears meshing with axes non-intersecting and non-parallel, each having generated side tooth surfaces and teeth of changing thickness from one end to the other and one having teeth whose opposite side tooth surfaces are of different profile curvature and the other having teeth whose opposite side tooth surfaces are of like profile curvature.

23. A pair of tapered gears meshing with axes non-intersecting and non-parallel, each having generated side tooth surfaces and one having teeth whose opposite side tooth surfaces are of different profile curvature.

24. A pair of tapered gears meshing with axes non-intersecting and non-parallel, each having generated side tooth surfaces, one having teeth whose opposite side tooth surfaces have the same profile curvature and the other having teeth whose opposite side tooth surfaces are of different profile curvature.

25. A pair of gears meshing with axes non-intersecting and non-parallel, one of which has teeth on its side face and each of which is provided with longitudinally curved teeth having generated side tooth surfaces and one having teeth whose opposite side tooth surfaces are of different profile curvature.

26. A pair of tapered gears meshing with axes non-intersecting and non-parallel, each of which is provided with longitudinally curved teeth having generated side tooth surfaces, and one having teeth whose opposite side tooth surfaces are of different profile curvature.

27. A pair of tapered gears meshing with axes non-intersecting and non-parallel, each of which is provided with longitudinally curved teeth having generated side tooth surfaces and one having teeth whose opposite side tooth surfaces are of different profile curvature, the spiral angle of the teeth of the smaller member of the pair being larger than the spiral angle of the teeth of the larger member of the pair.

28. A pair of tapered gears meshing with axes non-intersecting and non-parallel, each of which is provided with longitudinally curved teeth having generated side tooth surfaces, one of said gears having teeth whose opposite side tooth surfaces have the same profile curvature and the other of said gears having teeth whose oposite side tooth surfaces are of different profile curvature.

ERNEST WILDHABER.